INVENTORS
WILLIAM R. POLYE
JAMES E. BEVINS
BY
ATTORNEY

INVENTORS
WILLIAM R. POLYE
JAMES E. BEVINS

United States Patent Office 2,971,335
Patented Feb. 14, 1961

2,971,335

SPEED AND TEMPERATURE RESPONSIVE FUEL CONTROL SYSTEM FOR COMBUSTION ENGINES

William R. Polye, River Edge, and James E. Bevins, Ramsey, N.J., assignors to The Bendix Corporation, a corporation of Delaware Filed July 27, 1948, Ser. No. 40,918

21 Claims. (Cl. 60—39.28)

The instant invention relates to an electromechanical fuel control and regulating system and more particularly to a novel electrical control system for regulating the rate of fuel flow to a power plant which may include a jet or turbojet engine whose speed is to be automatically maintained within predetermined normal limits without having the temperature of a high-temperature portion of the gases in a combustion chamber, exceed a normal safe limit.

An object of the system is to supply the proper amount of fuel to an engine to keep the engine running at the desired speed, prevent the engine from exceeding the selected safe operating speed, and to keep parts from being damaged due to overheating and stabilize the rate of change of speed to prevent hunting in which the basic control is rate of change of temperature in the combustion chamber of the engine.

Another object of the invention is to provide an electrical control system for such engines in which there is provided a pilot's control lever for selection of the speed at which the engine is to run, a tachometer to sense the speed of the engine and signal when there is a difference between the selected speed and the actual speed of the engine, and an electrical co-ordinator which selects the rate of change of temperature to take place due to the difference between the selected speed and the actual speed as indicated by the tachometer sensing element.

In the invention, when the difference between actual engine speed and selected engine speed is great, there is provided electrical means whereby a large rate of change of temperature is selected which permits a rapid acceleration of the engine. As the selected speed and actual speed come into closer agreement, the rate of change of temperature, and hence the acceleration is gradually reduced to zero. Thus there is provided essentially critical damping on accelerations and decelerations.

In order to tune the system to the individual characteristics of the engine and to vary the rate of change of temperature allowable for different operating conditions, a control device responsive to ram air pressure or temperature is coupled to the system in such a way that it modifies the rate of change of temperature. The amount of modification and its character is adjusted to the individual engine. In general, the action of this control is to increase the sensitivity of the rate control as altitude is increased so as to allow engine speed to increase faster at sea level than at high levels and low speeds.

The above and other objects and features of the invention will appear more fully hereinafter from a consideration of the following description taken in connection with the accompanying drawings wherein one embodiment of the invention is illustrated by way of example.

Figure 1 somewhat diagrammatically shows an electromechanical system for operating a fuel throttle valve.

Figure 1:
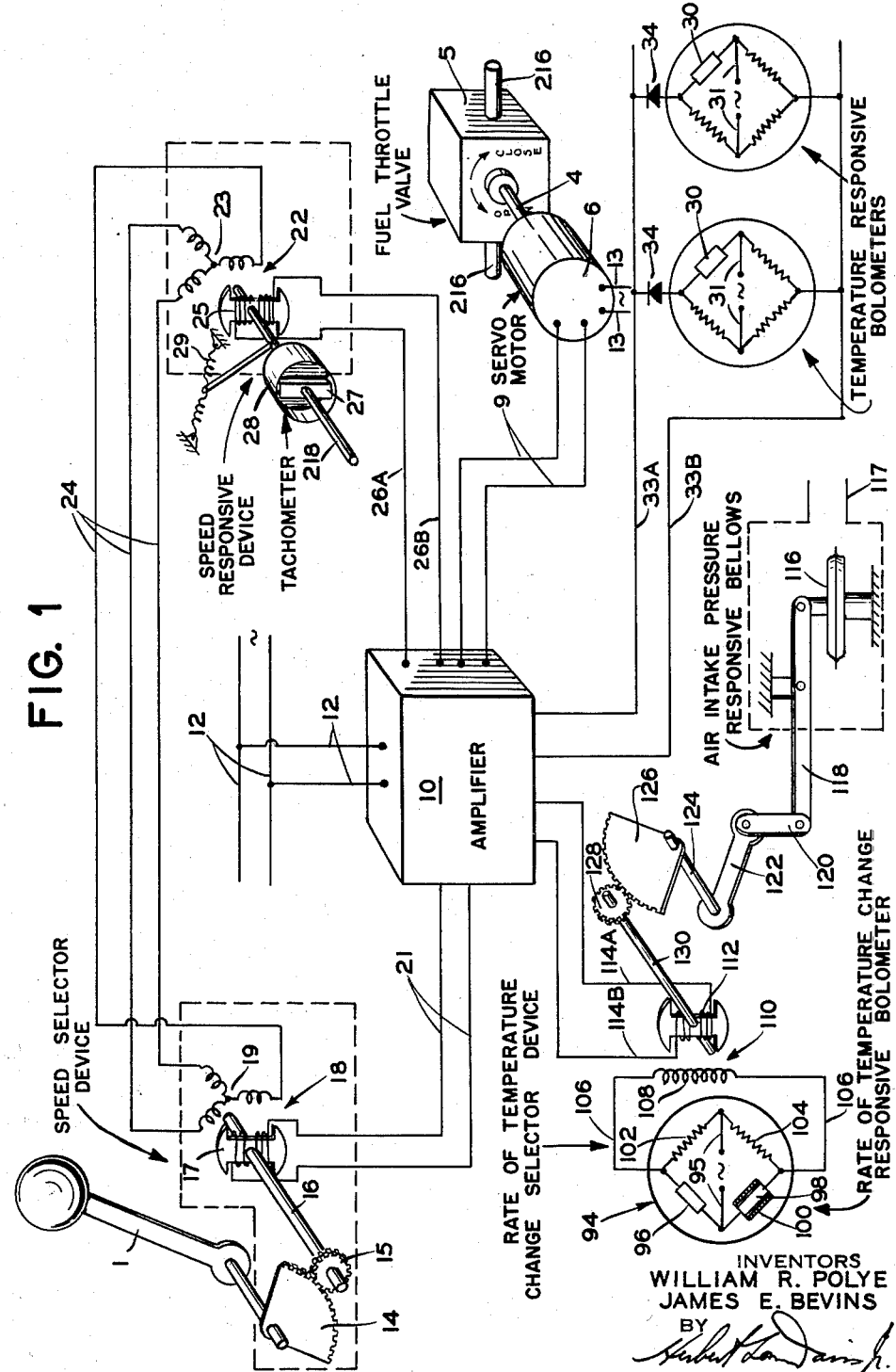

Referring to the drawing of Figure 1 a throttle lever 1 controls the setting of an automatic control which operates to position a stem 4 of a fuel throttle valve 5 through a reversible electric servo-motor 6. The servomotor 6 is shown in Figure 2 as a reversible two-phase motor having a control winding 8 connected by lines 9 with an output portion of an amplifier 10 and with the motors fixed—phase winding 11 connected with A.C. supply lines 12 through conductors 13.

Again referring to Figure 1, lever 1 is connected with a sector-gear 14 which meshes with a spur-gear 15 attached to a shaft 16 of the rotor winding 17 of a first variable inductive coupling means, i.e. electrical induction type transmitter or transformer 18, so that a movement of the throttle lever 1 turns the rotor winding 17 relative to a stator winding 19 of the first variable coupling means 18. The rotor winding 17 is connected, as shown in Figure 2, with an A.C. supply part 20 through lines 21 so that the stator winding 19 sets up a voltage component for governing the motor 6, corresponding with the relative angular displacement of rotor winding 17 to stator winding 19.

Figure 2:
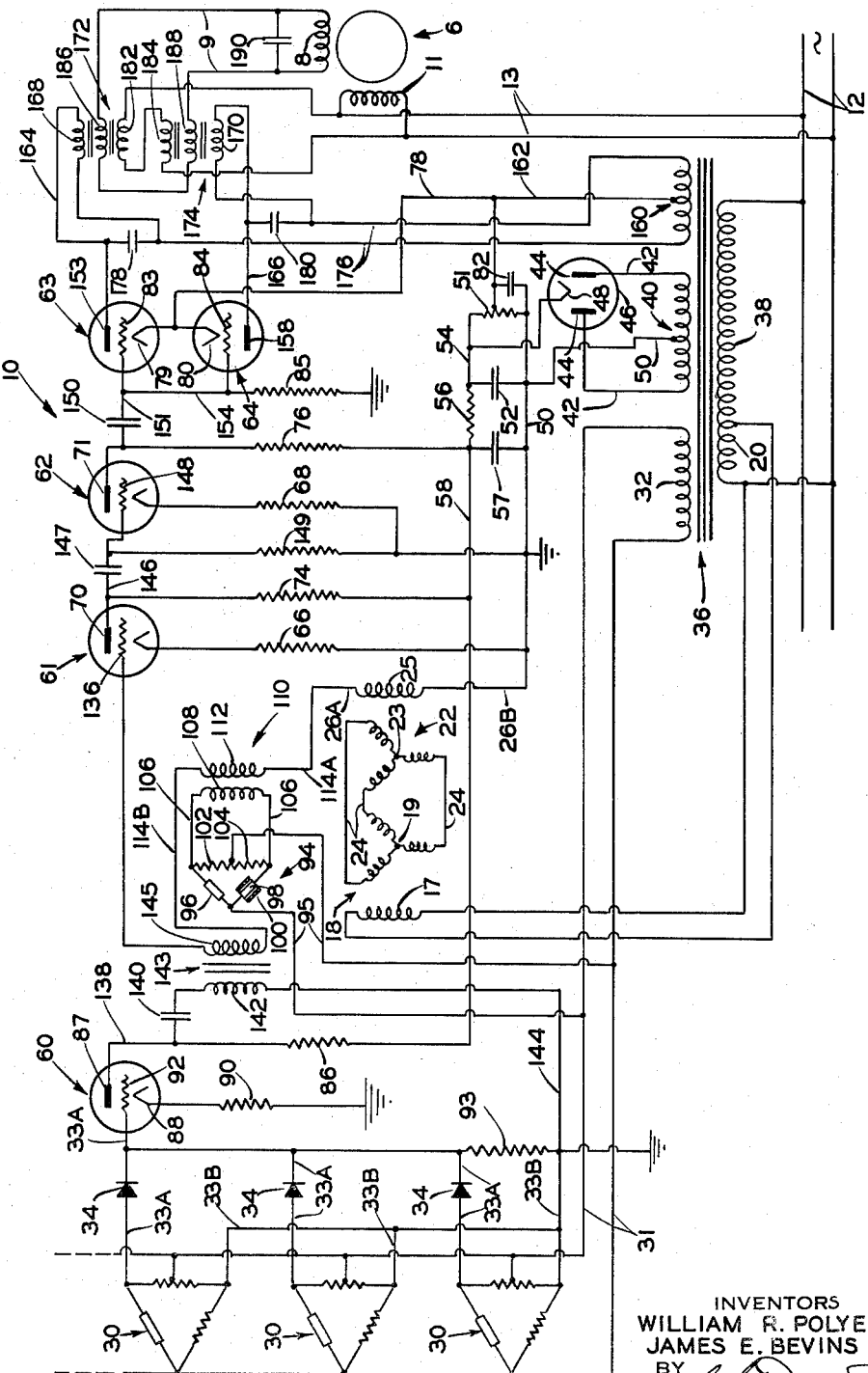
Figure 2 is a wiring diagram of the system of Figure 1.

A second variable inductive coupling means 22 has stator windings 23 connected by lines 24 with the stator windings 19 of the first variable coupling means 18, and its rotor winding 25 connected by lines 26A and 26B with the amplifier 10, as shown in Figures 1 and 2. The rotor winding 25 is turned through an angle corresponding with the engine speed by an engine-driven magnet 27 through a drag-cup 28 cooperating with magnet 27 against the bias of opposed tension springs 29. The resultant voltage across lines 26A and 26B corresponds with the difference between the engine speed, as measured by the rotor winding 25 of the second variable coupling means 22, and the position of the rotor winding 17 of the first variable coupling means 18 controlled by the position of the throttle lever 1. There is effected by the latter arrangement a 180° change of phase in the voltage across lines 26A and 26B when the sign of the speed difference changes to cause the phase of the amplifier output voltage across lines 9 to change and thus change the direction of rotation of motor 6.

A bolometer 30 is connected in a an A.C-bridge supplied by lines 31 leading from an A.C.-supply secondary 32 of the amplifier 10. The bolometer 30 is sensitive to the temperature at a point in the engine combustion chamber corresponding to that indicated in Figure 3 by the numeral 30, and provides a signal in lines 33A and 33B to the amplifier 10. The latter signal effects a voltage in the amplifier output lines 9 of a phase such as to cause motor 6 to rotate in a direction to close the fuel throttling valve 5 when a predetermined maximum temperature is exceeded. The amplitude of the signal is proportional to the difference between the actual temperature and the predetermined maximum temperature.

Figure 3:
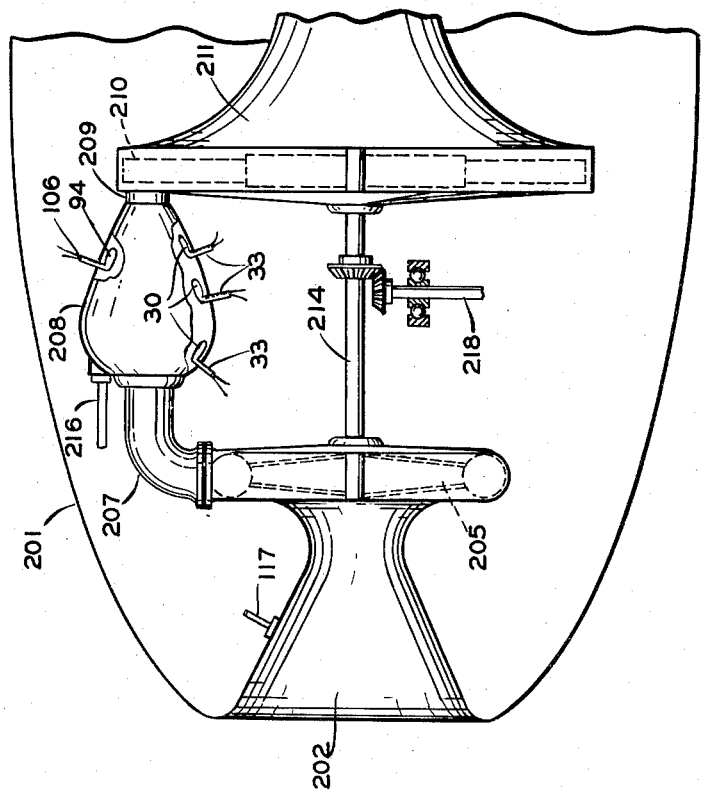
Figure 3 is a diagrammatic view of an engine or gas turbine with which the control mechanism is designed for use.

A plurality of the bolometers 30, as shown in Figures 1-3 may be arranged so as to be sensitive to the temperatures at a number of points in the combustion chamber of the engine, and the same may be connected, as shown in Figure 1, through a rectifier 34 and the lines 33A and 33B to the amplifier 10 so that, as is hereinafter explained, only the actual temperature above the predetermined maximum temperature is effective and controls the input signal to the amplifier 10. With rectifier 34 present, the temperature-sensitive means can be made to provide an overriding signal when an excessive temperature exists.

Referring to Figure 2, the amplifier 10 contains a number of electronic tubes, each of which is provided with conventional means (not shown) for heating its respective cathode. Certain of the electronic amplifier and discriminator tubes are provided with D.C. operating potentials by the following means: a power transformer 36 has its primary winding 38 connected with A.C. supply lines 12. A transformer portion 20 of the primary winding is used as aforementioned as the input to the first variable coupling means 18. A secondary winding 40 has its ends connected by lines 42 to anodes 44 of a dual rectifier tube 46 and a center-tap connected with a cathode 48 through grounded line 50, resistor 51, D.C. smoothing condenser 52, and line 54, as shown in Figure 2. The result is that full-wave rectification occurs to make line 54 positive to grounded line 50. A resistor 56 connects line 54 with line 58 and, with the aid of a condenser 57 provides a substantially constant tube-operating positive potential to line 58, relative to grounded conductor line 50.

Besides rectifier tube 46, there are five electronic valves or vacuum tubes, triodes 60, 61, 62, 63 and 64 inclusive. Amplifier tubes 61 and 62 have their respective cathodes respectively connected with grounded lead 50 through resistors 66 and 68. Anodes 70 and 71 of tubes 61 and 62 are connected through resistors 74 and 76 respectively to conductor 58. The resistor 51 between positive line 54 and grounded negative line 50 has a mid-point connected by line 78 in common to cathodes 79 and 80 of the discriminator tubes 63 and 64 to provide them with an operating bias potential which is smoothed with a condenser 82 connected between lines 50 and 78. Grids 83 and 84 of the discriminator tubes 63 and 64 are connected to ground through a resistor 85.

The electronic valve or vacuum tube 60 is controlled by one or more of the bolometers 30 so as to provide a signal to the amplifier tubes 61 and 62 upon any one of the bolometers being affected by a temperature in excess of a predetermined value.

Maximum temperature control

The rectifiers 34 arranged in the lines 33A of the several bolometers 30 are arranged so that the bolometer 30 affected by the excessive temperature will control, rather than providing an average of the several temperatures affecting the different bolometers 30.

In the combustion chamber excessively hot spots occur in the combustion gases which may be picked up by one or the other bolometers 30 to maintain a safe condition. By providing the rectifiers 34, the bolometer affected by such a hot spot, is not in effect shunted by the remaining bolometer bridge circuits, but rather the bolometer 30 subject to highest temperature will control the vacuum tube 60.

A potential for the tube 60 is applied from the lead 58 through a resistor 86 to an anode 87 of the tube 60, while a cathode 88 of tube 60 is connected through a resistor 90 of relatively low resistance, to ground. A control grid 92 of tube 60 is connected with the upper junction of each bolometer's A.C. bridge through line 33A and rectifier 34 and to ground through a resistor 93 of high resistance relative to resistor 90 to provide a positive bias to grid 92 relative to cathode 88. The lower junction of each such bridge is connected through lower lines 33B directly to ground.

The balancing point of the bridge circuits for the bolometers 30 are set at a sufficiently low temperature that in normal operation the temperature of the combustion gases will not decrease below that of the null point of the bridge or cause a reversal or shift of 180° of the voltage across lines 33A and 33B.

Further, the vacuum tube 60 is so arranged as to permit an electronic flow in the plate circuit only when the potential applied to the grid 92 has exceeded a predetermined positive value indicative of an excessive temperature condition affecting at least one of the bolometers 30 and providing an output signal from the bridge controlled by the bolometer in such a phase relation as to effect an overriding signal causing the motor 6 to rotate in a clockwise direction tending to close valve 5 to reduce the fuel supplied the combustion chamber.

The rectifier 34 serves as a means to prevent any temperature signal from reaching grid 92 until a predetermined maximum allowable temperature signal is obtained.

The forward resistance of rectifier 34 is high when the signal voltage at the rectifier is low. Therefore, practically no signal appears at the grid under the latter condition. As the signal voltage increases, the forward resistance decreases rapidly. The bolometer bridge constants are chosen so that the predetermined maximum allowable temperature signal voltage equals the voltage at which the forward resistance of the rectifier reduces to a low value. At this signal voltage, the rectifier attenuates the voltage at the grid 92 by only a very small amount so that practically full signal voltage is obtained at the maximum allowable temperature to effect an overriding control through operation of motor 6.

Temperature rate control

A partially-shielded bolometer A.C. bridge 94, which is sensitive to the temperature at a point in the combustion chamber of the engine, is used to generate an A.C. signal substantially proportional to the rate of change of said temperature, and with a shift of 180° as the sign of the temperature-rate changes. This bridge is likewise connected with A.C. supply 32 through conductors 31 and 95. This bridge includes two temperature-sensitive resistance elements 96 and 98, only the element 98 being provided with an insulating shield 100 so that there occurs a lag in the response to change in temperature by the element 98. Fixed resistances 102 and 104 complete the A.C. bridge. The output of A.C. bridge 94 is fed through lines 106 to stator winding 108 of a variable transformer or inductive coupling means 110 whose rotor winding 112 is connected with the amplifier 10 by lines 114A and 114B. Line 114A serially connects rotor winding 112 with rotor winding 25 of the variable transformer 22, as shown in Figure 2.

A diaphragm capsule 116 (see Figure 1) is evacuated and has its outer surface exposed to the pressure of the air flowing into the engine through a conduit 117 from the ram air inlet to the engine. The diaphragm 116 operates a lever 118 and, through a link 120, lever 122, shaft 124, sector-gear 126, pinion 128 and shaft 130, operates rotor winding 112, relative to its stator winding 108, of the variable transformer 110 through an angle which depends on the total pressure of the air flowing into the plant and in which the coupling relation between windings 108 and 112 increases with decrease in the air pressure or with altitude. The result is that the effect of the temperature-rate sensitive bolometer-bridge 94 is modified so as to be less at sea level than at a higher altitude. The ratio of the numbers of turns in windings 108 and 112 can be adjusted to provide the desired effect at, e.g., the prevailing altitude.

Figure 4:
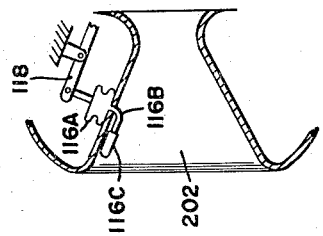
Figure 4 is a schematic view illustrating a modified form of rate of temperature change selector.

In an alternative form of the invention the capsule 116 instead of being evacuated may, as shown schematically in Figure 4, be in the form of a bellows 116A connected by a tube 116B to a bulb 116C filled with a suitable thermostatic fluid which is expansible with rise in temperature. The bulb 116C may be positioned in the ram air inlet so that the thermostatic fluid upon variations in ram air temperature is adapted to cause the bellows 116A to expand or contract. The bellows 116A is connected to a lever 118 which, as shown in Figure 1, may be connected through link 120, lever 122, shaft 124, sector gear 126, pinion 128 and shaft 130 so as to operate the rotor winding 112 relative to its stator winding 108 through an angle which depends on temperature of the inlet air to the engine. The coupling relation between windings 108 and 112 is decreased with increase in temperature and increased with fall in temperature at the ram air inlet so that the effect of the temperature rate sensitive bolometer-bridge 94 is modified so as to be greater at relatively low temperatures such as found at relatively high altitudes than under relatively higher temperature conditions such as found at sea level.

Inter-control

Referring again to Figure 2, the set speed signal is fed into lines 24 from the first variable coupling means 18 in accordance with the angular position of the latter's rotor winding 17. Lines 24 go from the stator windings 19 to the stator windings 23 of the second variable coupling means 22 whose rotor winding 25 is connected in series with other control windings hereinafter explained across a cathode and a grid 136 of the first triode tube 61. The signal output from winding 25 corresponds with the speed error, or difference of the actual speed from the set speed, and with a shift of 180° of the phase of the signal as the sign of the difference changes.

As was earlier noted, the bolometer 30 at a point of excessive temperature sets up an overriding signal component through its rectifier 34 which is fed to grid 92 of tube 60. The tube 60 has an output from its plate 87 only when the temperature affecting bolometer 30 exceeds a predetermined maximum value.

The A.C. component of the output from plate 87 passes through a line 138, condenser 140 and primary 142 of a step-up transformer 143 and thence through line 144 to ground. An A.C. signal is induced in secondary 145 of the step-up transformer 143 connected electrically in series with the signal from the rotor 25 of the variable coupling means 22 and rotor 112 of the variable induction transformer 110 and effective when the temperature of any bolometer 30 exceeds its respective maximum value to provide an overriding signal to the grid 136 of tube 61 which operates to keep the temperature within safe limits.

The temperature-rate similarly acts upon the bolometer-bridge 94 to set up an A.C. signal whose sensitivity is adjusted by the variable induction transformer 110 whose rotor winding 112 is in series with the windings 25 and 145, with the result that the net signal to the control grid 136 of the tube 61 is proportional to the sum of the signals induced in windings 25 and 112, subject to the overriding signal induced in winding 145.

Amplifier

The output from plate 70 of the tube 61 is carired by a lead 146 and condenser 147 to a control grid 148 of tube 62. The grid 148 is biased to ground through a resistor 149. An amplified output from plate 71 of tube 62 passes through a condenser 150 and lead 151 to the grid 83 of a discriminator tube 63 whose plate is 153. Lead 154 carries the same A.C. signal to the grid 84 of the second discriminator tube 64 whose plate 158 is oppositely biased relative to plate 153 by a secondary winding 160 of the power transformer 36 whose primary 38 is connected with the A.C. power supply 12. The center-tap of secondary 160 is connected by a lead 162 to the common lead 78 to cathodes 79 and 80 of the discriminator tubes 63 and 64. The grids 83 and 84 of the discriminator tubes 63 and 64 are connected to ground through a resistor 85 as previously described.

Hence the A.C. output of the second amplifier tube 62 when of the same phase as the potential of plate 153 of tube 63, produces half-wave swings in the output from the plate 153 of tube 63 and, when the A.C. output of tube 62 is of the opposite phase, it produces half-wave swings in the output from plate 158 of tube 64. Plates 153 and 158 are respectively connected by leads 164 and 166 with governing coils 168 and 170 of magnetic amplifier reactors 172 and 174, respectively. For input swings of one sign, magnetic amplifier reactor 172 has the higher output, while for input swings of the opposite sign, magnetic amplifier reactor 174 has the higher output, when the input signals and primaries are excited as shown in Figure 2.

A more detailed explanation of this magnetic amplifier system for operating a two-phase reversible control motor occurs in U.S. Patent No. 2,432,036 to Paul A. Noxon, patented December 2, 1947 and assigned to Bendix Aviation Corporation, Teterboro, New Jersey.

The respective plate currents pass through leads 176 from the governing coils 168 and 170 to the transformer secondary 160 and through the common lead 162 and 78 to the cathodes 79 and 80 of discriminator tubes 63 and 64. Condensers 178 and 180 respectively shunt the governing coils 168 and 170 for the purpose of bypassing both the fundamental and the second harmonic A.C. components so that the magnetic amplifier responds mainly to the residual D.C. component.

The magnetic amplifier reactors 172 and 174 have respective primary coils 182 and 184. The core arrangement (not shown) is such that secondary output coils 186 and 188 have no voltage of fundamental frequency induced therein by primary coils 182 and 184 respectively which are connected in parallel with reference winding 11 of the reversible two-phase motor 6 across A.C. supply 12. The motor's control winding 8 is shunted by a condenser 190 and these are together connected in series with the magnetic amplifier's secondary output coils 186 and 188 which buck each other to produce zero net voltage across the motor's control winding 8 when the net D.C. output of tubes 63 and 64 is the same.

In operation, for the same phase (e.g., as in A.C. supply lines 12) of the net signal to the grid 136 of tube 61 there is produced an output from discriminator tube 63 alone and a consequent higher relative output from magnetic amplifier reactor 172 with resultant clockwise, e.g., rotation of motor 6. Conversely, an opposite-phase of the net signal to grid 136 of the tube 61 produces an output from tube 64 alone with a consequently higher relative output from magnetic amplifier reactor 174 with a consequent counter-clockwise rotation of motor 6 to open the fuel throttling valve 5. The condenser 190 produces a phase shift of the voltage across control coil 8 of substantially 90° in either direction relative to the voltage across the reference winding 11 of motor 6, when there is output from plate 71 having one or the other phase relation. And in either direction, the steady speed of motor 6 is proportional to the voltage amplitude of the net signal to grid 136 of the first amplifier tube 61.

Controlled aircraft

Referring to Figure 3 there is indicated by numeral 201 a jet propelled aircraft or missile of a type which the described system is designed to control. The aircraft has a ram air inlet passage 202 leading to a supercharger 205. An air outlet passage 207 leads from the supercharger 205 to a combustion chamber 208 of conventional type. An exhaust passage 209 leads from the combustion chamber 208 to a turbine 210. A jet exhaust passage 211 leads from the turbine 210. The turbine 210 drives through a shaft 214 the blades of the supercharger 205. A conduit 216 is arranged so as to supply fuel to a suitable fuel nozzle in the combustion chamber 208 of the engine, while, as shown in Figure 1, the fuel throttle valve 5 in the supply line 216 is operated by the electro-mechanical system described to control the latter valve.

The engine drives the magnet 27 of Figure 1 through a shaft 218 driven by the shaft 214. Positioned in the combustion chamber 208 at a suitable point is the temperature rate sensitive device 94 and the maximum temperature limiting devices 30 previously described and shown diagrammatically in Figures 1, 2 and 3. The device 116 is connected through conduit 117 to the ram air rate of temperature change responsive bolometer 94 with changes in the pressure of the inlet 202 so as to vary the sensitivity of the inlet ram air.

Operation

A purpose of the control system is to supply the proper amount of fuel to a turboprop or turbojet engine, of a type such as shown in Figure 3, so as to keep the engine running at a speed selected by the operator in positioning through lever 1 the rotor winding 17 of the variable coupling means 18. When the speed of the engine is at the selected speed the winding 25 of the variable coupling means 22 will be at a position corresponding to that of the winding 17 due to the action of the drag cup 28 driven by the engine against the biasing force of spring 29 through shafts 214, 218 and bar magnet 27 rotatably mounted in the drag cup 28. Should the speed of the engine exceed the selected speed the winding 25 will be adjusted past the selected null position, whereupon there will be induced in the winding 25 a voltage which acting through the amplifier 10, as previously explained, will cause rotation of motor 6 in a clockwise direction tending to close valve 5 and decrease the fuel supplied to combustion chamber 208 so as to decrease the speed of the engine to return winding 25 to the selected null position.

If the engine speed decreases below the selected value there will be induced in the winding 25 a voltage having and opposite phase relation to that previously described and acting through the amplifier 10 to cause rotation of motor 6 in a counter-clockwise direction tending to open valve 5 and increase the fuel supplied to the combustion chamber to increase the speed of the engine and return the winding 25 to the selected null position.

Another purpose of the control system is to control the rate of temperature change in the combustion chamber 208. This is effected through the temperature rate sensitive device 94.

When the difference between actual engine speed and the selected engine is great, a high rate of change in combustion chamber temperature is permitted which in turn causes a rapid acceleration of the engine. As the selected engine speed and actual engine speed come into closer agreement, the rate of change in combustion chamber temperature is gradually reduced to zero.

In the temperature rate sensitive device 94 there is provided in the bridge circuit the elements 96 and 98, the resistance of which varies with change in temperature, the element 96 being rapidly responsive to change while the element 98 is protected by the shield 100 so as to more slowly respond to change in temperature. An increase in combustion chamber temperature thus causes the resistance element 96 to unbalance the bridge so that there is applied to winding 108 through conductors 106 a voltage having a phase relation such as to effect through the winding 112, inductively coupled thereto, a signal voltage which if unopposed would affect through amplifier 10 rotation of motor 6 in a clockwise direction tending to close valve 5 and decreasing the fuel supplied to the combustion chamber 208 until bridge 94 is rebalanced by the slower responsive resistor element 98.

When the increase in combustion chamber temperature results from the speed governor variable coupling means 22 calling for more engine speed, the signal voltage induced in winding 112 and calling for less fuel acts in opposition to the signal voltage induced in the series connected winding 25 calling for more fuel so as to limit the rate of permissible temperature change. The latter limit of course will vary with the extent that the actual and selected engine speeds are out of balance.

It has been further found desirable to increase the effect of the temperature rate sensitive device 94 with decrease in atmospheric pressure, temperature or increase in altitude.

This is accomplished by varying the coupling relation between the winding 112 and the winding 108 by providing the element 116 as a diaphragm capsule responsive to pressure connected through conduit 117 to the ram air inlet conduit 207, or by providing a suitable gas filled temperature responsive element 116A, as shown in Figure 4, connected by a tube 116B to a bulb 116C sensitive to the ram air inlet temperature for adjusting the winding 112. The element 116 and element 116A of Figure 4 are arranged to adjust winding 112 relative to winding 108 with changes in the ram air pressure or temperature so that as the ram air pressure or temperature decreases the coupling relation between windings 112 and 108 is increased so as to increase the induced voltage in winding 112 for a given rate of combustion chamber temperature change.

A further purpose of the system is to provide means for preventing the temperature of the gases in combustion chamber 208 from exceeding a safe limit. This is specifically accomplished by the temperature responsive element 30 which at excessive high temperatures unbalances the bridge circuit controlled thereby sufficiently so as to provide a signal voltage through rectifier 34 of a phase such as to effect through amplifier 10 rotation of the motor 6 in a clockwise direction to tend to close valve 5 and decrease the supply of fuel to the combustion chamber 208 so as to decrease the temperature below the maximum limit.

The latter signal voltage is applied to the grid 92 of the electronic valve 60 which is so arranged as to pass a signal voltage to the primary winding 142 of transformer 143 only when the predetermined maximum temperature has been exceeded resulting in a sufficient bias on grid 92. The signal voltage thus affecting primary winding 143 induces in the secondary winding 145 a voltage of such a phase as to call for less fuel and of such a magnitude as to provide an overriding effect on any signal voltage induced in winding 25 tending to call for more fuel. Thus the maximum temperature responsive means 30 prevents the temperature of the gases in the combustion chamber 208 from exceeding a predetermined maximum safe value.

The bridge controlled by the element 30 balances at a sufficiently low temperature so that during normal operation temperatures below the predeterminal maximum temperature do not affect the direction of rotation of the servo motor 6.

It is a further purpose of the system to provide the rectifier 34 so that where there are provided a plurality of the bolometers 30, the bolometer 30 affected by a temperature in excess of a predetermined maximum value will control, rather than the average temperatures of the several bolometers. The rectifiers 34 in the output circuits of the several bolometers 30, thus prevent the effective bolometer 30 from being shunted by the other bolometers 30.

In the combustion chamber 208, it has been found that hot spots at temperatures in excess of the predetermined maximum temperature may form in the combustion gases and in order to eliminate such condition, a plurality of bolometers 30 may be arranged in the chamber 208 so as to sense such excessive temperature conditions in the gaseous medium and correct the fuel supply accordingly.

In résumé, it will be seen that the invention provides electro-mechanical means for regulating the fuel to a power plant in accordance with the value of a plurality of variable conditions modifying an A.C. signal, which signal governs a servo motor 6 for operating the fuel throttle valve 5 to normally keep the engine speed within an operating range determined by the position of the throttle lever 1, and with temperature sensitive means 94 and 30 for keeping both the rate of change of temperature and the maximum temperature within safe limits. There is further provided means 116 responsive to air inlet pressure or temperature for changing the sensitivity of the temperature rate responsive means 94 so that its sensitivity is greater at relatively higher altitudes, than at relatively low altitudes.

Although only one embodiment of the invention has been illustrated and described, various changes in the form and relative arrangements of the parts may be made to suit requirements.

What is claimed is:

1. A fuel control system for an engine plant of the class in which the engine speed is to be normally maintained within a predetermined range and the maximum temperature at a selected point in the plant kept below a predetermined normal limit, comprising a pilot's control lever, a fuel throttle element, a first electric means for controlling the throttle element in accordance with the engine speed and including an operative connection to said first means from said lever to predetermine the normal operating speed range, a second electric means sensitive to the stated temperature for controlling said fuel throttle element when the predetermined normal limit is exceeded so as to decrease the fuel to said engine, a third electric means also sensitive to the temperature at a point in the plant for controlling the fuel throttle element in response to the rate of change of the last-mentioned temperature to prevent excessive changes in said temperature, an electric servo-motor, a control circuit for said electric motor including said first, second and third means serially connected therein to operate said motor in accordance with the resultant effect of said means, and a connection by which said servo-motor normally operates said fuel throttle element.

2. For use with an engine having a combustion chamber, an air inlet conduit to said chamber, an exhaust conduit from said chamber, a member driven by combustion gases of said chamber, and a valve for controlling flow of combustible fuel to said chamber, the combination comprising electric control means responsive to engine speed for positioning said valve to maintain the engine speed at a predetermined value, and a temperature responsive means for decreasing said speed value in proportion to the rate of increase in the temperature of said combustion chamber, said temperature responsive means including a normally balanced bridge circuit, a first temperature responsive variable resistance element forming one leg of said bridge circuit, a second temperature responsive variable resistance element forming another leg of said bridge circuit, said first and second elements being subject to change in temperature of the combustion gases in said chamber, and a shield for said first element so that said second element responds more rapidly to change in said temperature than said shielded first element, said second element upon change in said temperature unbalancing said bridge circuit and said first element more slowly responding to said change to tend to rebalance said bridge circuit.

3. For use with an engine having a combustion chamber, an air inlet conduit to said chamber, an exhaust conduit from said chamber, a member driven by combustion gases of said chamber, and a valve for controlling flow of combustible fuel to said chamber, the combination comprising electrical control means responsive to engine speed for positioning said valve to maintain the engine speed at a predetermined value, a temperature responsive means including a first element rapidly responsive to changes in combustion chamber temperature and operatively connected to said control means for decreasing said value in proportion to the rate of increase in the temperature of said combustion chamber and a second element operatively connected to said control means and slowly responsive to change in said temperature for counteracting the action of said first element.

4. The combination defined by claim 3 including a diaphragm sensitive to the pressure in said air inlet conduit, and inductive coupling means operatively connecting said temperature responsive means to said control means and operated by said diaphragm to increase the effect on the control means of said temperature responsive means with decrease in the air inlet pressure.

5. The combination defined by claim 3 including another temperature responsive variable resistance means operatively connected to said control means so as to tend to effect closure of said valve when the temperature in said combustion chamber exceeds a predetermined safe value.

6. For use with an engine having a combustion chamber, an air inlet conduit to said chamber, an exhaust conduit from said chamber, a member driven by combustion gases of said chamber, and a valve for controlling flow of combustible fuel to said chamber, the combination comprising, an electric servo motor for positioning said fuel control valve, a control network for said motor, variable inductive coupling means including a rotor winding in said network for controlling said servo motor, regulating means responsive to engine speed for controlling the angular position of said rotor winding so as to tend to maintain said engine speed at a predetermined value, and a temperature-responsive variable resistance means operatively connected in said network for controlling said network so as to override said inductive coupling means to cause said servo motor to tend to close said fuel control valve upon the temperature in said chamber exceeding a predetermined safe value.

7. Means for controlling an engine having a combustion chamber and a turbine driven by combustion gases from said chamber, the combination comprising an electrical control circuit, engine speed responsive means for affecting said circuit, means for regulating flow of fuel to said chamber, motor means controlled by said speed responsive means through said circuit for affecting said regulating means to maintain the engine speed constant, and a temperature responsive means operatively connected in said control circuit and means responsive to rate of change of temperature and producing a signal proportional to rate of change in the temperature of said combustion gases for affecting said control circuit so as to limit the rate of permissible temperature change.

8. Means for controlling an engine having a combustion chamber and a turbine driven by combustion gases from said chamber, the combination comprising an electrical control circuit, engine speed responsive means for affecting said circuit, means for regulating flow of fuel to said chamber, motor means controlled by said speed responsive means through said circuit for affecting said regulating means to maintain the engine speed constant, and a plurality of temperature responsive elements positioned in spaced relation in said combustion chamber for sensing combustion gases having a temperature in excess of a predetermined safe value, means operatively connecting said elements in said control circuit including means for overriding said speed responsive means in response to any one of said temperature responsive elements upon said one element being affected by a temperature in excess of the predetermined safe value.

9. Means for controlling an engine having a combustion chamber and a turbine driven by combustion gases from said chamber, the combination comprising an electrical control circuit, engine speed responsive means for affecting said circuit, means for regulating flow of fuel to said chamber, motor means controlled by said speed responsive means through said circuit for affecting said regulating means to maintain the engine speed constant, and said electrical control circuit including a first element adjusted by said speed responsive means, a temperature responsive means affected by the temperature of the combustion chamber gases, and means operatively connecting said temperature responsive means in said control circuit including a second element controlled by said temperature responsive means and serially connected to said first element for affecting the control circuit.

10. The combination defined by claim 9 in which said temperature responsive means affects said second element in accordance with the rate of change in the temperature of said combustion gases for retarding change in the flow of fuel to said combustion chamber.

11. For use with an engine having a combustion chamber, an air inlet conduit to said chamber, an exhaust conduit from said chamber, and a member driven by the combustion gases; means for controlling the speed of said engine comprising, in combination, a first part driven by said engine, a second part whose position is affected by the speed of said first part, an electrical control circuit having an alternating current signal output in accordance with the difference between a selected engine speed and actual engine speed and including a first variable inductive coupling means positioned by said second part to control said alternating current signal and a second variable inductive coupling means electrically connected to said first inductive coupling means, manually operable means to position said second variable inductive coupling means to select the normal operating speed of the engine, a motor controlled by said alternating current signal, and means for regulating flow of fuel to the combustion chamber and operatively controlled by said motor to maintain the selected engine speed.

12. The combination defined by claim 11 including a second circuit inductively coupled to the output of said control circuit, said second circuit including an element responsive to the temperature of the combustion gases for controlling the alternating current signal in said output in accordance with the temperature of the combustion gases.

13. A fuel control system for a combustion engine of an aircraft in which the engine speed is to be normally maintained within a predetermined range and the maximum temperature of the combustion gases at a selected point in the engine kept below a predetermined normal limit, comprising a pilot's control lever, a first means for regulating the fuel supplied said engine and thereby the engine speed and including an operative connection to said first control lever to predetermine the normal operating speed range, a second means sensitive to the temperature of the combustion gases for decreasing the fuel supplied said engine when the predetermined normal limit is exceeded, a third temperature rate of change control device responsive to the temperature of the combustion gases including a first element rapidly responsive to change in said temperature and a second element slowly responsive to change in said temperature for counteracting said first element so as to vary the fuel supplied said engine in proportion to the rate of change of the last-mentioned temperature, and a fourth means responsive to change in the altitude of the aircraft for increasing the rate of response of the third means with increase in the altitude of said aircraft.

14. A fuel control system for a combustion engine of an aircraft in which the engine speed is to be normally maintained within a predetermined range and the maximum temperature of the combustion gases at a selected point in the engine kept below a predetermined normal limit, comprising a first means for producing an A.C. signal in accordance with the difference between a preselected engine speed and actual engine speed and including a first part driven by said engine, a second part whose position is affected by the speed of said first part to control said A.C. signal, a second means operatively connected to said first means and sensitive to the temperature of the combustion gases for controlling said A.C. signal when the stated predetermined normal temperature limit is exceeded, a third means also operatively connected to the first means and sensitive to the temperature of the combustion gases at a selected point in the engine for causing said A.C. signal to vary in proportion to the rate of change of the last-mentioned combustion gas temperature, a fourth means operatively connecting said third means to said first means for altering the effect of said third means on said first means so that the third means has less effect on said first means at sea level than at a higher altitude, and a fifth means operatively connected to said first means for automatically controlling the rate of fuel flow into the engine in accordance with said A.C. signal.

15. A fuel control system as set forth in claim 14 in which said third means includes a temperature-responsive device having a thermally lagged portion and an A.C. output voltage component proportional to the rate of temperature change and an 180° phase shift of such component as the sign of the temperature-rate changes, and said fourth means includes a variable inductive coupling means electrically connected to said third means, and means for varying said inductive coupling means so as to modify the value of the signal from said third means to provide an A.C. signal component having a lesser effect at sea level than at higher altitudes.

16. A fuel control system for a combustion engine of an aircraft in which the engine speed is to be normally maintained within a predetermined range and the maximum temperature of the combustion gases at a selected point in the engine kept below a predetermined normal limit, comprising a manually operable control lever, a first means for producing an A.C. signal in accordance with the difference between a selected engine speed and actual engine speed and including a first part driven by said engine, a second part whose position is affected by the speed of said first part, a first variable inductive coupling means positioned by said second part to control said A.C. signal, and a second variable inductive coupling means positioned by said control lever and electrically connected to said first inductive coupling means to select the normal operating speed range of the engine; a second means operatively connected to said first means and sensitive to the temperature of the combustion gases for controlling said A.C. signal when a predetermined normal temperature limit is exceeded, a third means also operatively connected to the first means and sensitive to the temperature of the combustion gases at a selected point in the engine for causing said A.C. signal to vary in proportion to the rate of change of the last-mentioned combustion gas temperature, a fourth pressure responsive means sensitive to a pressure of the air flowing into the engine for combustion of said fuel for altering the effect of said third means on said first means so that the third means has less effect on said first means at sea level than at a higher altitude, a throttle valve having a valve stem for controlling the rate of fuel flow into the engine in accordance with the position of the valve stem, means including an electric servomotor controlled by said A.C. signal and said servo motor drivingly connected with said valve stem.

17. A fuel control system for an internal combustion engine plant of the class in which the engine speed is to be normally maintained within a predetermined range and the maximum temperature combustion gases at a selected point in the plant kept below a predetermined normal limit, comprising a manually operable control lever, a first means for producing an A.C. signal in accordance with the difference between a selected engine speed and actual engine speed and including a first part driven by said engine, a second part whose position is affected by the speed of said first part, a first variable inductive coupling means positioned by said second part to control said A.C. signal, and a second variable inductive coupling means positioned by said control lever and electrically connected to said first inductive coupling means to select the normal operating speed of the engine; a second means operatively connected to said first means and sensitive to the temperature of the combustion gases to control said A.C. signal when a predetermined combustion gas temperature limit is exceeded, a third means also operatively connected to said first means and sensitive to the temperature of the combustion gases at a point in the plant for controlling said A.C. signal in proportion to the rate of change of the last-mentioned temperature, a fourth temperature responsive means sensitive to temperature of the air flowing into the plant for combustion of said fuel for altering the effect of said third means on said first means so that the third means has less effect on said first means at sea level than at a higher altitude, a throttle valve having a valve stem for controlling the rate of fuel flow into the plant in accordance with the position of the valve stem, means including an electric servo motor controlled by said A.C. signal, and said servo motor drivingly connected with said valve stem.

18. For use in an aircraft including an engine having a combustion chamber, an air inlet conduit to said chamber, an exhaust conduit from said chamber, a member driven by combustion gases of said chamber, and a valve for controlling flow of combustible fuel to said chamber, the combination comprising electrical control means responsive to engine speed for positioning said valve to maintain the engine speed at a predetermined value, a temperature responsive means including a first element rapidly responsive to changes in combustion chamber temperature and operatively connected to said control means for decreasing said value in proportion to the rate of increase in the temperature of said combustion chamber, a second element operatively connected to said control means and slowly responsive to change in said temperature for counteracting the action of said first element, and an altitude responsive means operatively connected to said temperature responsive means to increase the effect of said temperature responsive means on the control means with increase in the prevailing altitude of the aircraft.

19. For use with an engine having a combustion chamber, an air inlet conduit to said chamber, an exhaust conduit from said chamber, a member driven by combustion gases of said chamber, and a valve for controlling the flow of combustible fuel to said chamber, the combination comprising electrical control means responsive to engine speed for positioning said valve to maintain the engine speed at a predetermined value, a temperature responsive means including a first element rapidly responsive to changes in combustion chamber temperature and operatively connected to said control means for decreasing said value in proportion to the rate of increase in the temperature of said combustion chamber, a second element operatively connected to said control means and slowly responsive to change in said temperature for counteracting the action of said first element, and means operatively connected to said temperature responsive means to vary the effect of said temperature responsive means on said control means during operation of the engine.

20. For use with an engine having a combustion chamber, an air inlet conduit to said chamber, an exhaust conduit from said chamber, a member driven by combustion gases of said chamber, and a valve for controlling flow of combustible fuel to said chamber, the combination comprising, an electric servo motor for positioning said fuel control valve, a control network for said motor, variable inductive coupling means in said network for controlling said servo motor, regulating means responsive to engine speed for controlling said variable inductive coupling means so as to tend to maintain said engine speed at a predetermined value, a temperature responsive means operatively connected in said network for also affecting said servo motor to tend to decrease the flow of combustible fuel upon an increase in the temperature in said combustion chamber so as to maintain the predetermined engine speed value, said temperature responsive means including variable inductive coupling means for operatively connecting said temperature responsive means in said network, and means operatively connected to said variable inductive coupling means to adjust the variable coupling means so as to vary the effect of said temperature responsive means on said servo motor during operation of the engine.

21. A fuel control system for a combustion engine of an aircraft in which the engine speed is to be normally maintained within a predetermined range and the maximum temperature of the combustion gases at a selected point in the engine kept below a predetermined normal limit, comprising a first means for producing an A.C. signal in accordance with the difference between a preselected engine speed and actual engine speed and including a first part driven by said engine, a second part whose position is affected by the speed of said first part to control said A.C. signal, a second means operatively connected to said first means and sensitive to the temperature of the combustion gases for controlling said A.C. signal when the stated predetermined normal temperature limit is exceeded, a third means controlled by said first and second means so as to regulate the rate of fuel flow into the engine in accordance with said A.C. signal, said second means including a plurality of temperature-sensitive devices each constructed to have an A.C. output voltage component corresponding with the difference of its actual temperature from the predetermined normal limit, and a rectifier for each of said devices arranged to pass only the output of its said device when the latter's actual temperature exceeds a predetermined normal limit, whereby the net A.C. signal output from said second means is substantially zero as long as the temperature of each such device is below its predetermined normal limit and, when the temperature of any such device exceeds its said limit, such output as an A.C. voltage component depending upon each such temperature-excess and also has such a phase as to cause said third means to reduce the rate of fuel flow.

References Cited in the file of this patent

UNITED STATES PATENTS

| | | |
|---|---|---|
| 1,946,155 | Foster | Feb. 6, 1934 |
| 2,219,994 | Jung | Oct. 29, 1940 |
| 2,245,562 | Becker | June 17, 1941 |
| 2,246,516 | Herzog | June 24, 1941 |
| 2,261,343 | De Florez | Nov. 4, 1941 |
| 2,301,348 | Wallgren et al. | Nov. 10, 1942 |
| 2,361,790 | Noxon | Oct. 31, 1944 |
| 2,363,342 | Lesnick | Nov. 21, 1944 |
| 2,382,847 | Baumann | Aug. 14, 1945 |
| 2,390,084 | Edwards | Dec. 4, 1945 |
| 2,403,371 | Ifield | July 2, 1946 |
| 2,404,428 | Bradbury | July 23, 1946 |
| 2,416,097 | Hauser | Feb. 18, 1947 |
| 2,420,043 | Johnson | May 6, 1947 |
| 2,439,198 | Bedford | Apr. 6, 1948 |
| 2,450,907 | Newton et al. | Oct. 12, 1948 |
| 2,455,654 | Browne | Dec. 7, 1948 |
| 2,457,595 | Orr | Dec. 28, 1948 |
| 2,474,018 | Sparrow | June 21, 1949 |
| 2,478,909 | Flagle | Aug. 16, 1949 |
| 2,491,380 | Kutzler | Dec. 13, 1949 |
| 2,492,472 | Fortescue | Dec. 27, 1949 |
| 2,538,582 | Mordell et al. | Jan. 16, 1951 |
| 2,606,420 | Moore | Aug. 12, 1952 |
| 2,662,372 | Offner | Dec. 15, 1953 |

FOREIGN PATENTS

| | | |
|---|---|---|
| 605,093 | Great Britain | July 15, 1948 |

UNITED STATES PATENT OFFICE
CERTIFICATION OF CORRECTION

Patent No. 2,971,335                                February 14, 1961

William R. Polye et al.

It is hereby certified that error appears in the above numbered patent requiring correction and that the said Letters Patent should read as corrected below.

Column 6, lines 73 and 74, strike out "rate of temperature change responsive bolometer 94 with changes in the pressure of the" and insert the same after "the", second occurrence, in line 75, same column 6.

Signed and sealed this 15th day of August 1961.

(SEAL)
Attest:
ERNEST W. SWIDER
Attesting Officer

DAVID L. LADD
Commissioner of Patents